US011461665B2

(12) United States Patent
Andersson

(10) Patent No.: US 11,461,665 B2
(45) Date of Patent: Oct. 4, 2022

(54) SYSTEMS AND METHODS OF A BOOLEAN NETWORK DEVELOPMENT ENVIRONMENT

(71) Applicant: Kåre L. Andersson, Svenshögen (SE)

(72) Inventor: Kåre L. Andersson, Svenshögen (SE)

(*) Notice: Subject to any disclaimer, the term of this patent is extended or adjusted under 35 U.S.C. 154(b) by 491 days.

(21) Appl. No.: 16/680,671

(22) Filed: Nov. 12, 2019

(65) Prior Publication Data

US 2021/0142184 A1 May 13, 2021

(51) Int. Cl.
*H04N 21/482* (2011.01)
*G06F 30/327* (2020.01)
*G06N 3/063* (2006.01)
*G06N 3/12* (2006.01)
*G06N 7/00* (2006.01)

(52) U.S. Cl.
CPC .............. *G06N 3/126* (2013.01); *G06N 7/00* (2013.01)

(58) Field of Classification Search
CPC ........ G06N 3/126; G06N 7/00; G06N 3/0472; G06N 3/084; G06N 3/063
USPC ....................................................... 706/1–62
See application file for complete search history.

(56) References Cited

U.S. PATENT DOCUMENTS

| 4,276,029 | A  | * | 6/1981  | Gilson ................... | G09B 9/302 434/43 |
| 7,219,048 | B1 | * | 5/2007  | Xu ......................... | G06F 30/327 703/19 |
| 2003/0225718 | A1 | * | 12/2003 | Shmulevich ............. | G16B 5/20 703/11 |
| 2008/0152217 | A1 | * | 6/2008  | Greer ................. | G06V 10/7715 375/240 |
| 2010/0138872 | A1 | * | 6/2010  | Lee ......................... | H04N 21/84 725/54 |
| 2010/0180310 | A1 | * | 7/2010  | Lee ....................... | H04N 21/482 725/54 |
| 2012/0062784 | A1 | * | 3/2012  | Van Heugten ......... | G02B 26/08 348/340 |
| 2013/0305199 | A1 | * | 11/2013 | He .......................... | G06F 30/34 716/104 |
| 2021/0142184 | A1 | * | 5/2021  | Andersson ............. | G06N 3/126 |

\* cited by examiner

*Primary Examiner* — Brandon S Cole
(74) *Attorney, Agent, or Firm* — Monarch IP Group, PLLC; April M. Mosby

(57) ABSTRACT

A system and method of generating a Boolean network development environment for qualitative processing may include an alternative setup of NAND-gates implemented in a design to solve complex problems, such as image recognition and automatic decision making/categorization. The method may include initializing a network using a target bitstring and actuating binary propagation thereby, using a predetermined set of inputs to generate an output bitstring. Further, the method may include actuating binary feedback using the output bitstring. A source may be updated until the convergence of all values are completed, wherein the result is compared to the target bitstring.

17 Claims, 10 Drawing Sheets

Model of the filter level development

FIG. 5

500 instance of 300

510 turn counter: 277
550 last turn s update: 94

520: 0.97635  
530: 0.90579098429849746 <=training hitrate  
540: 0.97436418403429176 <= best s value (training)  
560: 0.97746394230769236  
570: 0.92236976506639426 <=best test hitrate 434 training target  
432 training output

414 O  
412 A  
      B

422

SYSTEMS AND METHODS OF A BOOLEAN NETWORK DEVELOPMENT ENVIRONMENT

BACKGROUND

Currently, there is a great interest in Artificial Neural Networks (ANNs) as a computer system that can mimic the thought processing of a brain in an effort to learn and process images and data. In particular, the system can learn how to perform tasks by considering examples, without being programmed with task-specific rules. More particularly, ANNs are frequently used as tools that filter data, wherein intelligent outputs result from a given set of inputs in various disciplines including, pattern recognition, system identification and control, medical diagnosis, finance, data mining, visualization, machine translation, social network filtering, weather forecasting, data security and the like. Neural networks are gradual in nature; and hence require a substantial amount of training in order to produce accurate results. However, since neural networks do not primarily rely on frequency of occurrence, they have been found to be useful tools. There are several suggestions for how to employ such networks in using Field Programmable Gate Arrays (FPGAs), wherein better speed and parallelization result over that which graphic cards currently provide. Yet, an ANN must be converted first using some advanced scheme, which is costly and complex.

In an effort to achieve a simplified solution, some have implemented generic algorithms within a system to provide the same type of processing that an ANN provides. These, however, are often sluggish and not adequate for complex problems. Simple setups with Boolean networks may provide a solution. Yet, the methods for developing Boolean networks using an evolutionary approach remain sluggish.

It is within this context that the embodiments arise.

SUMMARY

Embodiments of a system and method of swift Boolean network development environments, which is capable of solving advanced recognition problems with a relative high success rate, are provided. It should be appreciated that the present embodiment can be implemented in numerous ways, such as a process, an apparatus, a system, a device, or a method. Several inventive embodiments are described below.

In some embodiments, a method for Boolean network development is provided. The method for Boolean network development may include initializing a network hierarchy to define a number of cells and rows corresponding to a network. The method may also include selecting a target bitstring and actuating binary propagation of a predetermined set of inputs to generate an output bitstring. Further, the method may include actuating binary feedback using the output bitstring and updating the source connections. Moreover, the method may include detecting convergence completion, wherein, in response to no completion detected, repeating the actuating of binary propagation, the actuating of binary feedback, the updating of the source connections, until convergence completion. Additionally, the method may include detecting similarity to the target. Finally, the method may include generating multiple filters for each route stop.

In some embodiments, a Boolean network development environment system is provided. The system may include a memory and a processor operable to initialize a network hierarchy to define a number of cells and rows corresponding to a network. The processor may also be operable to select a target bitstring and actuating binary propagation of a predetermined set of inputs to generate an output bitstring. Further, the processor may also be operable to actuate binary feedback using the output bitstring. The processor may also be operable to update the source connections. Moreover, the processor may also be operable to detect convergence completion, wherein, in response to no completion detected, processor may also be operable to repeat the actuating of binary propagation, the actuating of binary feedback, the updating of the source connections, until convergence completion. Additionally, the processor may also be operable to detect similarity to the target. Finally, the processor may also be operable to generate multiple filters for each route stop.

In some embodiments, a tangible, non-transitory, computer-readable media having instructions whereupon which, when executed by a processor, cause the processor to perform the Boolean network development environment method described herein. The method for Boolean network development may include initializing a network hierarchy to define a number of cells and rows corresponding to a network. The method may also include selecting a target bitstring and actuating binary propagation of a predetermined set of inputs to generate an output bitstring. Further, the method may include actuating binary feedback using the output bitstring and updating the source connections. Moreover, the method may include detecting convergence completion, wherein, in response to no completion detected, repeating the actuating of binary propagation, the actuating of binary feedback, the updating of the source connections, until convergence completion. Additionally, the method may include detecting similarity to the target. Finally, the method may include generating multiple filters for each route stop.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

FIG. 5 is a block diagram of a process user interface representing select bitstrings associated with the Boolean network development environment of FIG. 4B, in accordance with some embodiments.

DETAILED DESCRIPTION

Figure 1:
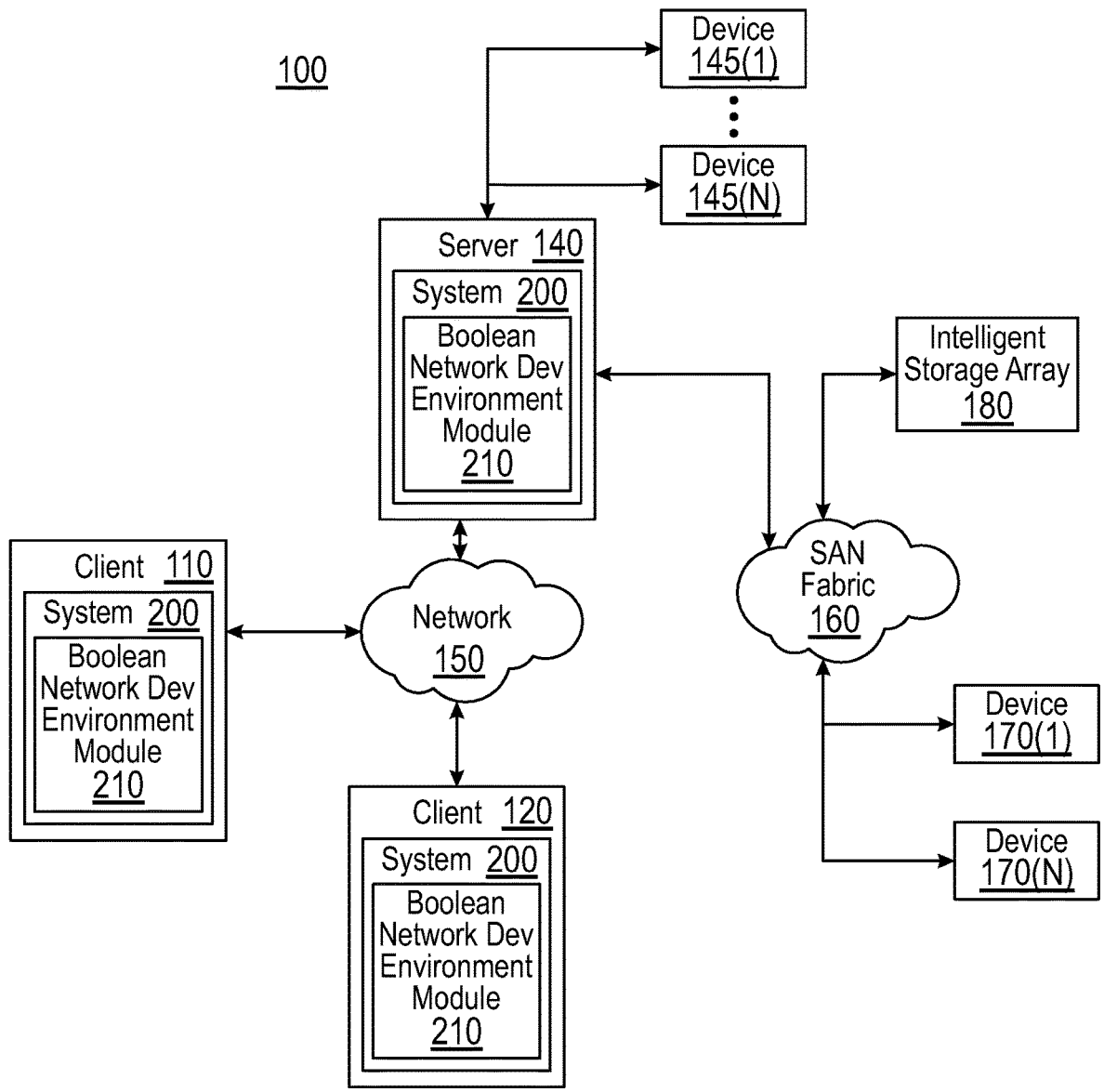
FIG. 1 is a block diagram of an exemplary network incorporating the systems and methods of establishing a Boolean network development environment for qualitative processing, in accordance with some embodiments.

The following embodiments describe systems and methods of generating Boolean network development environments expeditiously, which is capable of solving advanced recognition problems with a relative high success rate. It can be appreciated by one skilled in the art, that the embodiments may be practiced without some or all of these specific details. In other instances, well known process operations have not been described in detail in order not to unnecessarily obscure the embodiments.

A system and method for developing a simple Boolean network expeditiously, which is capable of solving advanced recognition problems with a relative high success rate is presented herein. In particular, the method for Boolean network development may include initializing a network hierarchy to define a number of cells and rows corresponding to a network. The method may also include selecting a target bitstring and actuating binary propagation of a predetermined set of inputs to generate an output bitstring. Further, the method may include actuating binary feedback using the output bitstring and updating the source connections. Moreover, the method may include detecting convergence completion, wherein, in response to no completion detected, repeating the actuating of binary propagation, the actuating of binary feedback, the updating of the source connections, until convergence completion. Additionally, the method may include detecting similarity to the target. Finally, the method may include generating multiple filters for each route stop.

In some embodiments, the method of actuating binary feedback may include inserting the output bitstring back into the first cell. This method may further include propagating the feedback from the first cell downwards row-by-row and calculating a set of feedback inputs for each cell of the first row, including a first and a second feedback input (feedbA and feedbB) associated with each cell.

In some embodiments, the method of updating of the source connections may include eliminating the source positions associated with each transversal (perpendicular) bitstring and selecting a predetermined share of cells in a last row. Further, the method may further include updating only a first predetermined share of cells in the last row and detecting whether only one cell remains. Moreover, the method of updating of the source may include performing, in response to the updating of the cells in the last row, the detecting, decrementing, and updating steps until one cell remains and actuating propagation.

Advantageously, the Boolean network development environment provided herein can be used to develop custom types of Boolean networks for system behavior prediction, genetic regulation, image processing, and various other applications. The system and method of defining a Boolean Network Environment may comprise an alternative setup, wherein NAND-gates are implemented in the design to solve complex problems, offering both speed and simplicity simultaneously. That is, the purpose of following suggested approach is to derive a more economically feasible way of implementing Boolean networks for system behavior prediction, genetic regulation, image processing, and various other applications.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions, which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "selecting," "initializing," "identifying," "initiating," "detecting," "actuating," "updating," "generating," "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Regarding usage and terminology, in this disclosure, unless otherwise specified and/or unless the particular context clearly dictates otherwise, the terms "a" or "an" mean at least one, and the term "the" means the at least one.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary network incorporating the systems and methods of establishing a Boolean network development environment for qualitative processing is shown. As shown, the exemplary network architecture 100 may include client systems (computing devices) 110 and 120, and in communication with server 140 through network 150. As detailed above, all or a portion of network architecture 200 may perform and/or be a means for performing, either alone or in combination with other elements, one or more of the steps disclosed herein (such as one or more of the steps illustrated in FIG. 3A-3D). All or a portion of network architecture 100 may also be used to perform and/or be a means for performing other steps and features set forth in the instant disclosure. In one example, computing device 110 may be programmed with one or more of modules 210 (described in detail below). Additionally or alternatively, server 140 may be programmed with one or more of modules 210. Although not shown, in various embodiments, the client node (110, 120) including system 200 may be full body scanners, x-ray scanners, Computed Tomography (CT) scanners, notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

Figure 7:
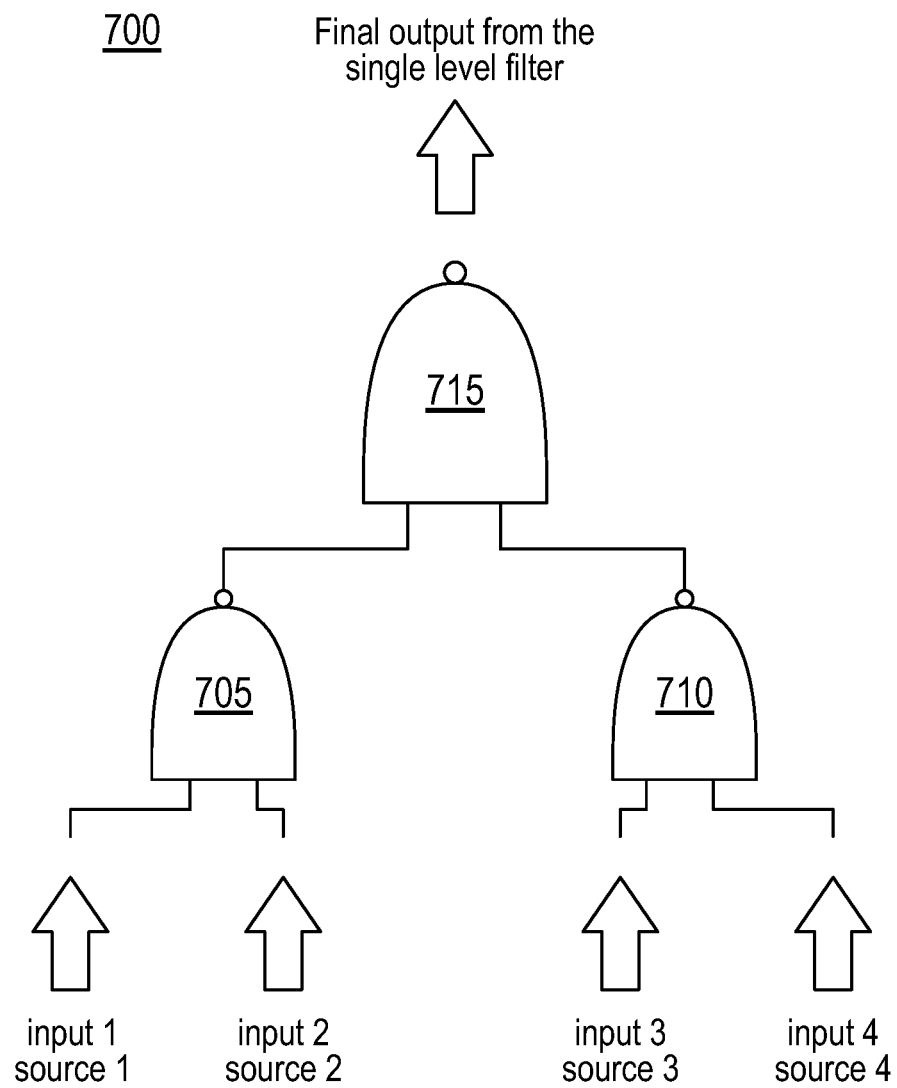
FIG. 7 is a schematic representing a NAND gate scheme for an exemplary Boolean network development model relative to the model given in FIG. 4B, in accordance with some embodiments.

Client systems 110 and 120 generally represent any type or form of computing device or system, such as exemplary computing system 700 in FIG. 7. Similarly, server 140 generally represents computing devices or systems, such as application servers or database servers, configured to provide various database services and/or run certain software applications. Network 150 generally represents any telecommunication or computer network including, for example, an intranet, a WAN, a LAN, a PAN, or the Internet. In one example, client systems 110, and/or 120 and/or server 140 may include all or a portion of system 200 from FIG. 2.

In some embodiments, one or more storage devices 145(1)-(N) may be directly attached to server 140. Storage devices 145(1)-(N) generally represent any type or form of storage device or medium capable of storing data and/or other computer-readable instructions. In certain embodiments, storage devices 145(1)-(N) may represent Network-Attached Storage (NAS) devices configured to communicate with server 140 using various protocols, such as Network File System (NFS), Server Message Block (SMB), or Common Internet File System (CIFS)

Server 140 may also be connected to a Storage Area Network (SAN) fabric 160. SAN fabric 160 generally represents any type or form of computer network or architecture capable of facilitating communication between a plurality of storage devices. SAN fabric 160 may facilitate communication between server 140 and a plurality of storage devices 170(1)-(N) and/or an intelligent storage array 180. SAN fabric 160 may also facilitate, via network 150 and server 140, communication between client systems 110 and 120, and storage devices 170(1)-(N) and/or intelligent storage array 180 in such a manner that devices 170(1)-(N) and array 180 appear as locally attached devices to client systems 110 and 120.

In certain embodiments, and with reference to exemplary computing system 700 of FIG. 7, a communication interface may be used to provide connectivity between each client system 110 and 120 and network 150. Client systems 110 and 120 may be able to access information on server 140 using, for example, a web browser or other client software. Such software may allow client systems 110 and 120 to access data hosted by server 140, storage devices 145(1)-(N), storage devices 170(1)-(N), or intelligent storage array 180. Although FIG. 1 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 140, storage devices 145(1)-(N), storage devices 170(1)-(N), or intelligent storage array 180, or any combination thereof. All or a portion of one or more of the exemplary embodiments disclosed herein may also be encoded as a computer program, stored in server 140, and distributed to client systems 110 and 120 over network 150.

One or more components of network architecture 100 may perform and/or be a means for performing, either alone or in combination with other elements, one or more steps of an exemplary method for adaptive data processing. It is appreciated that the components of exemplary operating environment 100 are exemplary and more or fewer components may be present in various configurations. It is appreciated that operating environment may be part of a distributed computing environment, a cloud computing environment, a client server environment, and the like.

Figure 2:
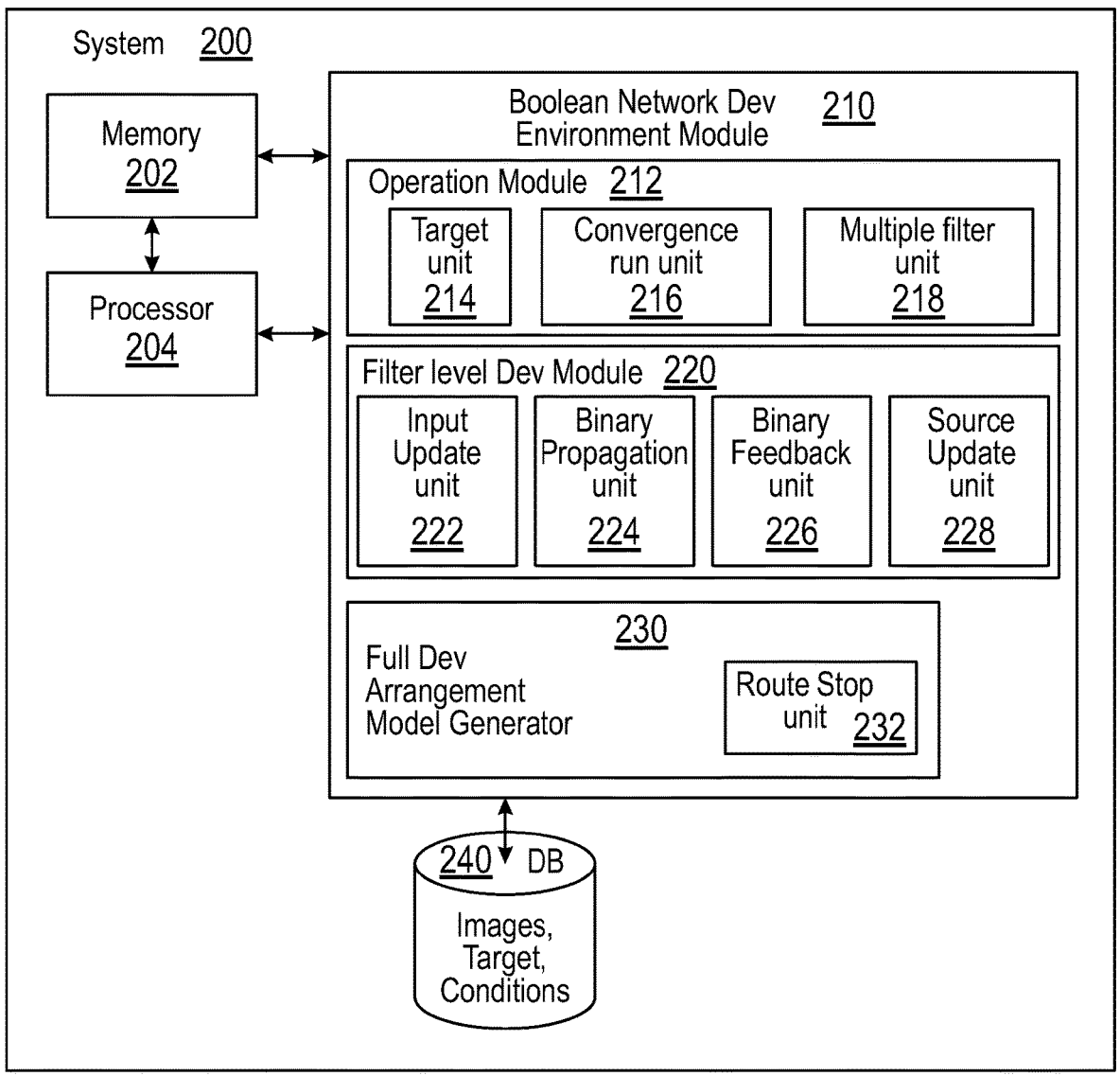
FIG. 2 is a block diagram of an exemplary system for Boolean network development environment within the components of the exemplary network of FIG. 1, in accordance with some embodiments.

Referring to FIG. 2, an exemplary embodiment of system for Boolean network development environment within the components of the exemplary network of FIG. 1 is shown. Exemplary system 200 may be implemented in a variety of ways. For example, all or a portion of exemplary system 200 may represent portions of exemplary system 100 in FIG. 1. As illustrated in this figure, exemplary system 200 may include a memory 202, a processor 204, and a storage database 240. The system may include one or more Boolean network development modules 210 for performing one or more tasks. For example, and as will be explained in greater detail below, Boolean network development module 210 may include an operations module 212, a Boolean network (filter level) development module 220, and a full development (multiple filter arrangement) generator 230. The operations module 212 can include the target unit 214 for selecting the target bitstring for processing. Further, the operations module 212 may include a convergence run unit 216 for detecting the convergence of recognized patterns and the target bit string. The operations module 212 may also include a multiple filter unit 218. The Boolean network (filter level) development module 220 may include an input update unit 222, a binary propagation unit 224, a binary feedback unit 226, and a source update unit 228. The full development generator module 230 can generate different application models of different image recognition processes. In particular, the full development generator may include a route stop unit 232 for processing route stop arrangements for a multi-choice arrangement (as described in detail with reference to FIG. 5).

In operation, Boolean network development environment module 210 may listen to the network for incoming data to initialize the development environment process. In particular, the operations module 212 may, in response to user request, initialize a hierarchy of a Boolean network to define a plurality of cells and a plurality of rows corresponding to the Boolean network. Additionally, the target unit 214 may initialize the process for selecting a target bitstring for all cases. In the alternative, the target unit 214 may select a target bitstring for a predetermined portion of cases. Further, the target unit 214 may initialize the Boolean network using the target bitstring. For example, the target unit 214 may include identify a first cell and calculate the inverse of the target bitstring. In response, the operations module 212 may initialize the Boolean network by inserting the target bitstring into the input of the first cell (feedbA of cell 0), where feedbB of the same cell is set to the inverse of feedbA (NOT feedbA). Further, the operations module 212 may assign the cells in the last row of the development setup random sources for each cell; wherein the output from the cells are equal to the inputs of the cells with respect to each source setting. For example, each source can represent the status of a pixel. In response, the filter level development module 220 can initiate the processing of a "turn" or loop of the process for updating the input, performing the binary propagation, performing the binary feedback, and updating the plurality of source connections. The filter level development module 220 can perform these functions until convergence is completed. In particular, the input update unit may provide the input to the Boolean network model. The binary propagation unit 224 may perform a binary propagation of the input back towards the first row. For example, the binary propagation unit 224 may apply a predetermined set of inputs to a last row of the Boolean network, wherein the row includes a first set of cells, each cell representing one input in a two-input NAND gate. The binary propagation unit 224 may also feed outputs of each set of cells on each row of the hierarchy into the inputs of subsequent row, until one output remains and setting the output bitstring to equal the output. Next, the binary feedback unit 226 may perform binary feedback of the Boolean network model. Subsequently, the source update unit 228 may perform the process to update the plurality of source connections. When convergence is detected, the filter level development module 220 can evaluate the similarity of the source in comparison to the target. For example, the filter level development module 220 may use the following formulas for calculating the similarity, S:

$$N = \frac{\sum (AB)_b}{\sum (A)_b \times \sum (B)_b} + \frac{\sum (A'B')_b}{\sum (A')_b \times \sum (B')_b}$$

$$D = N + \frac{\sum (A'B)_b}{\sum (A')_b \times \sum (B)_b} + \frac{\sum (AB')_b}{\sum (A)_b \times \sum (B')_b}$$

$$S = \frac{N}{D}$$

where $\Sigma(A)_b$, $\Sigma(B)_b$, $\Sigma(A')_b$, $\Sigma(B')_b$ all are greater than 0, b denotes respective parenthesis as a Boolean expression, and each sum denotes the number of is within. For this particular similarity function, the filter level development module 220 calculates weighted hits. Instead of just calculating s=hits/(hits+misses), the probabilities of combinations of AB, ab, Ab, aB for a general position are taken into account, such that rare coincidences are weighted by division of their likelihood. Further, the filter level development module 220 may select a source constellation having the highest similarity value. Moreover, the full development generator module 230 may generate multiple filters for each route stop, wherein the route stop unit is used to initiate and process the route stop modules (explained more in detail with reference to FIG. 5.

It is appreciated that the components of exemplary operating environment 100 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the Boolean Network Development Environment architecture using any arrangement components necessary to perform the network development environment and other development features (and functionality); and can be implemented in one or more separate or shared modules in various combinations and permutations.

Figure 3A:
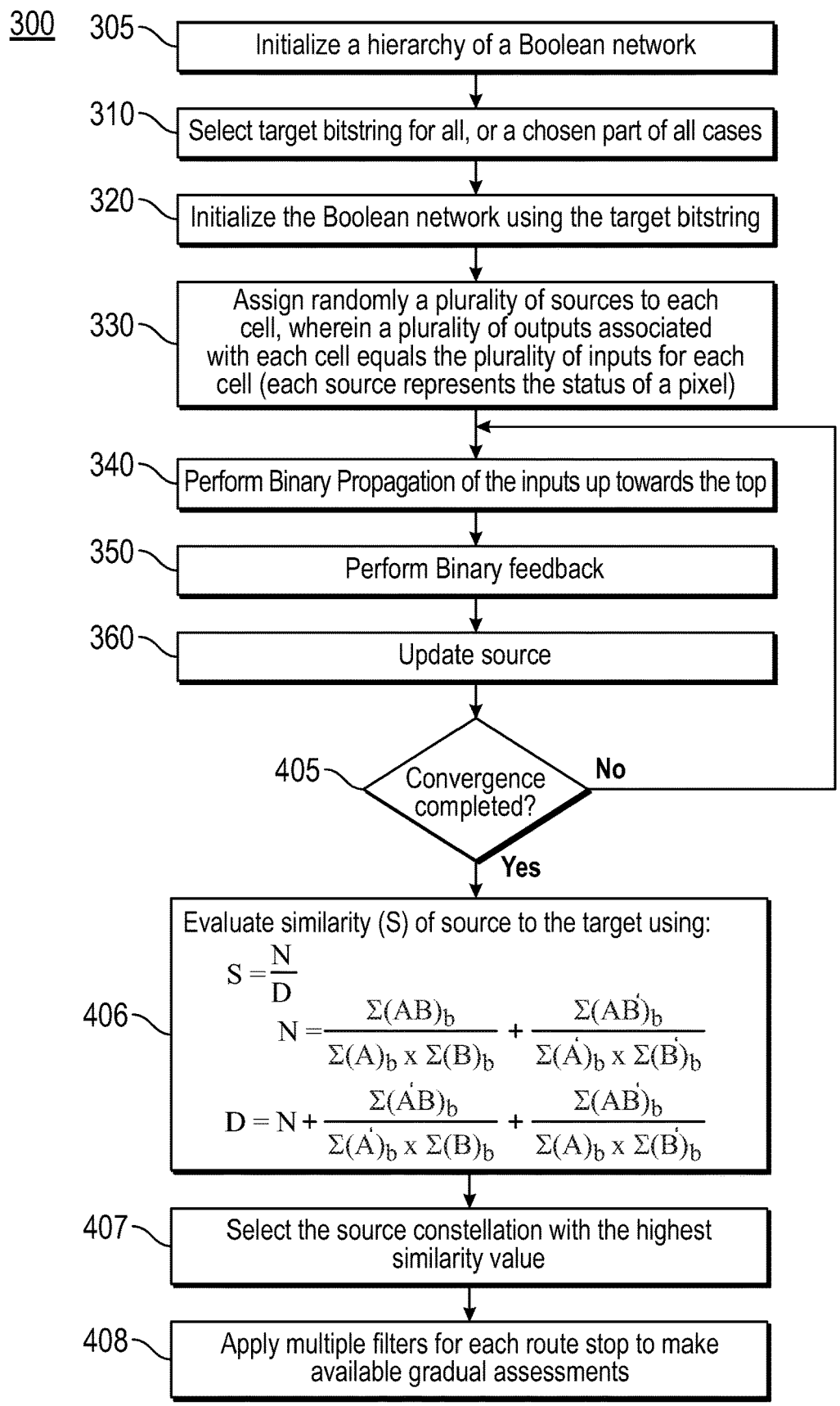
FIG. 3A is an exemplary flow diagram of a method for Boolean network development environment associated with complex dynamics, in accordance with some embodiments.

Referring now to FIG. 3A, an exemplary flow diagram of a method 300 for Boolean network development environment associated with complex dynamics, in accordance with some embodiments is shown. In particular, the method may include initializing a hierarchy of a Boolean network to define a plurality of cells and a plurality of rows corresponding to the Boolean network in an action 305. Additionally, in an action 310, the method may include selecting a target bitstring for all cases. In the alternative, the target bitstring may be selected for a predetermined portion of the cases. Further, the method may include initializing the Boolean network using the target bitstring in an action 320. For example, the method for initializing the Boolean network may include identifying a first cell and calculating the inverse of the target bitstring. The method for initializing the Boolean network may further include inserting the target bitstring into the input of the first cell (feedbA of cell 0), where feedbB of the same cell is set to the inverse of feedbA (NOT feedbA). In an action 330, the method includes assigning the cells in the first row of the filter random sources for each cell; wherein the output from the cells are equal to the inputs of the cells with respect to each source setting. For example, each source can represent the status of a pixel. In a loop (also known as a "turn") that is repeated until the convergence is completed (actions 340, 350, 360, and 405), the method includes performing binary propagation of the input back towards the first row in an action 340. For example, the method of binary propagation may include applying the predetermined set of inputs to a last row of the Boolean network, wherein the last row includes a first set of cells, each cell representing one input in a two-input NAND gate. The method of binary propagation may also include feeding outputs of each set of cells on each row of the hierarchy into the inputs of subsequent row, until one output remains and setting the output bitstring to equal the output. Next, in an action 350, the method includes performing binary feedback (more particularly illustrated in FIG. 3B). The source is updated in a process action 360 (as shown in FIG. 3C). The steps of the loop are processed until a convergence is detected at action 405. When convergence is detected, the method includes evaluating the similarity of the source in comparison to the target in an action 406. For example, the method of evaluating the similarity may include calculating similarity (S) using the following (noted supra):

$$S = \frac{N}{D}$$

$$N = \frac{\sum (AB)_b}{\sum (A)_b \times \sum (B)_b} + \frac{\sum (A'B')_b}{\sum (A')_b \times \sum (B')_b}$$

$$D = N + \frac{\sum (A'B)_b}{\sum (A')_b \times \sum (B)_b} + \frac{\sum (AB')_b}{\sum (A)_b \times \sum (B')_b}$$

where $\Sigma(A)_b$, $\Sigma(B)_b$, $\Sigma(A')_b$, $\Sigma(B')_b$ all are greater than 0, b denotes respective parenthesis as a Boolean expression, and each sum denotes the number of is within. This similarity function calculates weighted hits. Instead of just calculating s=hits/(hits+misses), the probabilities of combinations of AB, ab, Ab, aB for a general position are taken into account, such that rare coincidences are weighted by division of their likelihood. Further, the method may include selecting a source constellation with the high similarity value in an action 407. Moreover, the method may include generating multiple filters for each route stop in an action 408. It should be noted that during the turns, the output string can fluctuate somewhat. Mostly it will converge, but sometimes the last row cell source updates will cause a slight regress in the first row value. This can be evaluated by the similarity formulas given above. By always using the source constellation with the highest similarity value toward the target for realized filter levels and only using sub-optimal constellations during development, an optimal realized filter level function can be achieved.

Figure 3B:
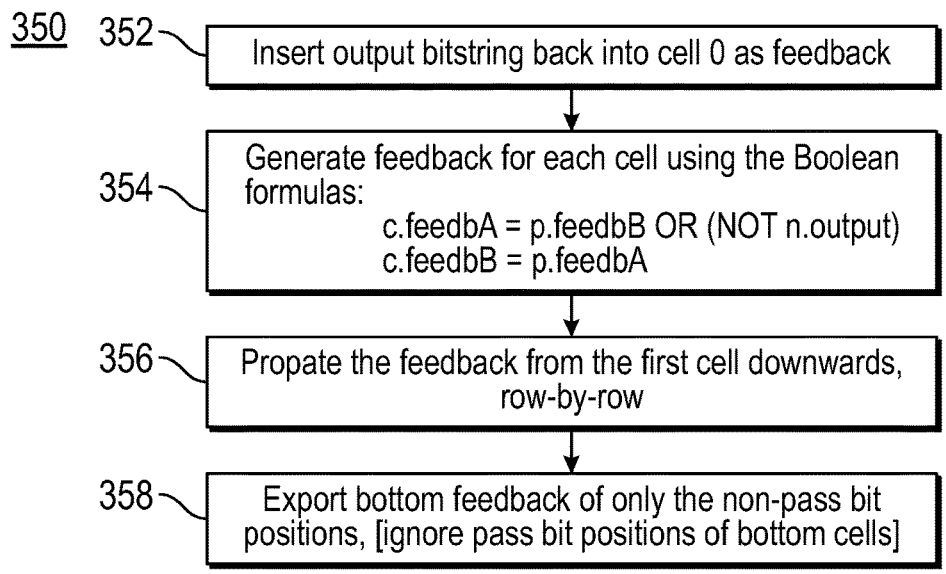
FIG. 3B is an exemplary flow diagram of the binary feedback process for the method for Boolean network development environment of FIG. 3A, in accordance with some embodiments.
Figure 3C:
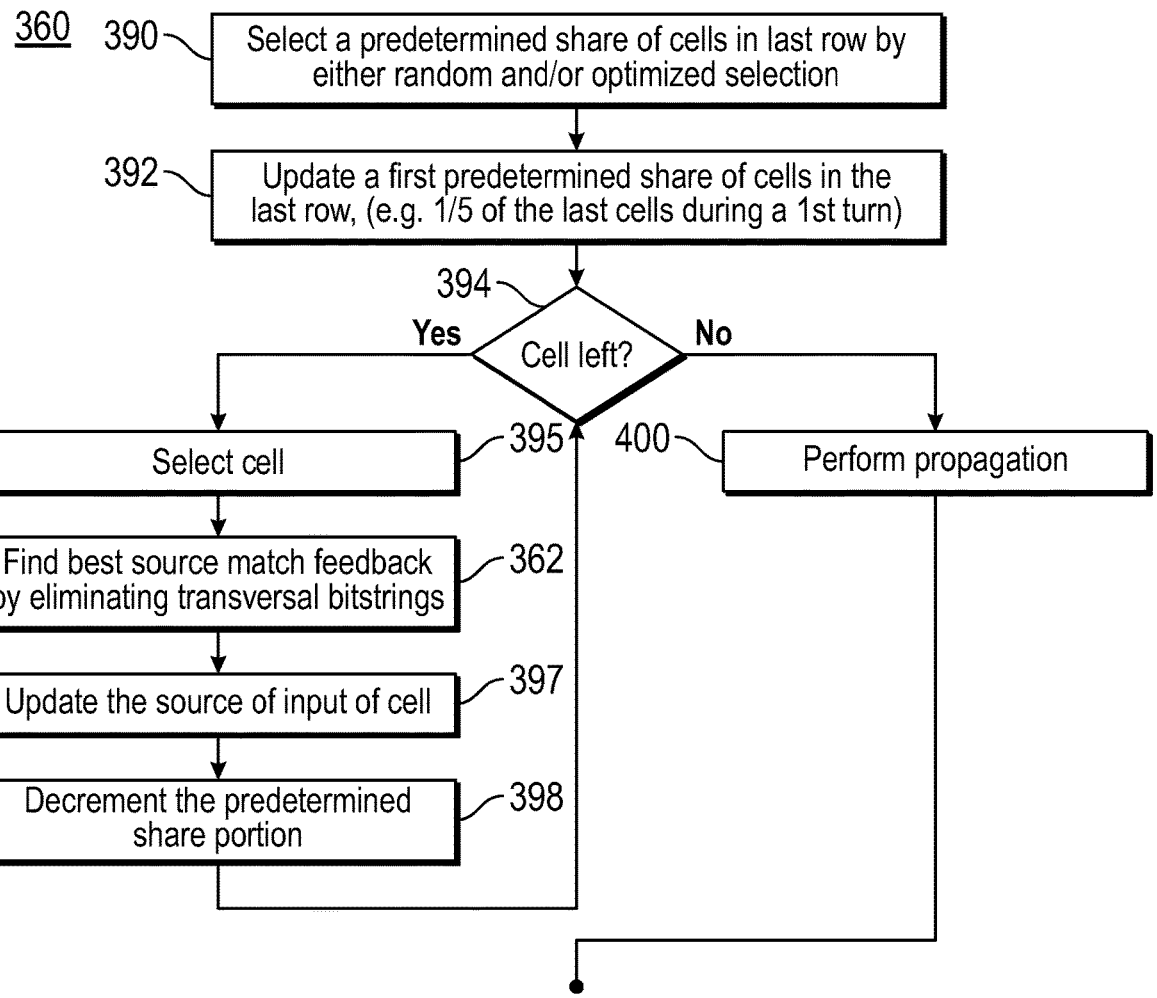
FIG. 3C is an exemplary flow diagram of the source update process for the method for Boolean network development environment of FIG. 3A, in accordance with some embodiments.

Referring now to FIG. 3B, an exemplary flow diagram of the binary feedback process 350 for the method for Boolean network development environment of FIG. 3A, in accordance with some embodiments is shown. In particular, in an action 352, the method may include inserting the output bitstring back into the first cell. Further, the method may include calculating a set of feedback inputs for each cell, including a first and a second feedback input (feedbA and feedbB) associated with each cell in an action 354. For example, each feedback input may be calculated using the following:

c.feedbA=p.feedbB OR (NOT n.output),
c.feedbB=p.feedbA where, p is the parent of the cell c and n is the neighbor of the cell c (c=0, 1, 2, 3, . . . x). Additionally, the method may include propagating the feedback from the first cell forward row-by-row in an action 356. Finally, in an action 358 the method may include exporting non-pass bit positions of last row feedback, wherein pass bit positions equal 1 and non-pass bit positions can be used as a reference during source update.

Figure 3D:
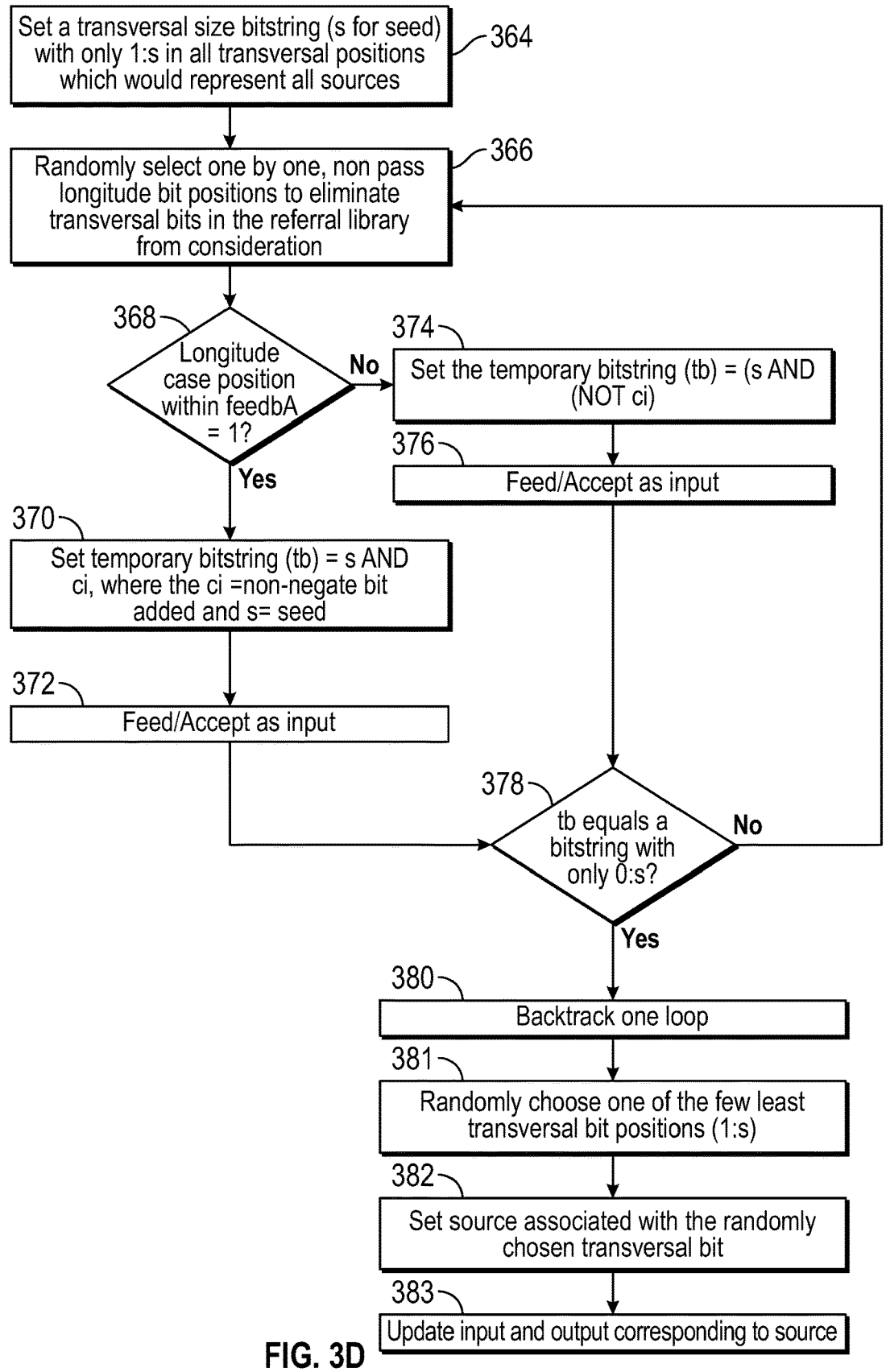
FIG. 3D is an exemplary flow diagram of the elimination of traversal bitstrings associated with the method for Boolean network development environment of FIG. 3A, in accordance with some embodiments.

Referring now to FIG. 3C, an exemplary flow diagram of the plurality of source connections update process associated with the method for Boolean network development environment of FIG. 3A, in accordance with some embodiments is shown. In particular, in an action 390, the method may include selecting a predetermined share of cells in a last row. Additionally, the method may include updating a portion of the predetermined share of cells in the last row in an action 392. In a decision action 394, the method may include detecting whether a cell remains. When a cell is detected, the method may include selecting a cell in an action 395. Further in an action 362, the method may include eliminating positions of a plurality of transversal bitstrings associated with the plurality of source connections in an effort to find the best source match feedback (as illustrated in FIG. 3D). Next, the method may include updating, in response to eliminated transversal bitstrings, the source connections of cells in the last row in an action 397. Further, the method may include decrementing the portion of the predetermined share portion in an action 398 and proceeding back up to decision action 394 to detect whether a cell remains. Accordingly, the steps of the detecting (394), the selecting (395), the eliminating (362), the updating (397), and the decrementing (398) are repeated until no cell remains. When, however, no cell is detected, the method may include actuating propagation in an action 400.

In some embodiments, it should be noted that the elimination process described depicts the update of the source of input of one single last row cell. To save time and prevent system oscillation (by stability), only a selected portion of the last row cells are updated during a first turn (e.g. ⅕ of the last row cells selected). Then, in the subsequent turns of the looped actions, smaller portions may be selected (e.g. ⅙, ⅐, and the like), until only one cell is updated each turn. Once the share for the actual turn is updated, propagation is performed again. Another note is that the share of cells can be either randomly chosen (random), or selected by the share of cells which contains the most erroneous longitude bit positions (i.e. non pass sources in need of update (optimized)). One good approach is to alternate between random update and optimized update, on even and odd turns. This will provide both a fast start and high accuracy towards the end of the optimization.

Referring now to FIG. 3D, an exemplary flow diagram 362 of the elimination of traversal bitstrings associated with the method for Boolean network development environment of FIG. 3A, in accordance with some embodiments is shown. In particular, in an action 364, the method may include setting a transversal size bitstring seed (s). Further, the method may include selecting in a random sequence the non-pass bit positions in an action 366. In a decision action 368, the method may include detecting whether the longitude case position within feedbA equals one. When it is detected that the longitude case position equals one, the method may include setting a temporary bitstring (tb) equal to (s AND ci), where ci is the non-negated bit, in an action 370. In the alternative, when it is detected that the longitude case position not equal to one, the method may include setting the tb equal to (s AND NOT ci), in an action 374. The method proceeds by accepting tb as input, in actions 372 and 376. In a decision action 378, the method may include detecting whether tb equals a bitstring of only "0"s. When no detection of bitstring of only "0"s is detected, the method may include performing the selecting the non-pass bit positions (action 366), the detecting longitude case position equals one (action 368), the setting tb (actions 370 and 374), the accepting tb as input (actions 372 and 376) and detecting whether tb equals a bitstring of only "0"s (action 378) steps, until bitstring of only "0"s is detected. Further, the method may include referencing, in response to detecting bitstring of only "0"s, a previous loop tb, in an action 380. Additionally, the method may include selecting one transversal bit of a portion of the least transversal bit positions using a random sequence, in an action 381. Further, the method may include setting the source to the selected transversal bit, in an action 382. Next, the method may include updating the inputs and output of the cell corresponding to the source, in an action 383.

Figure 4A:
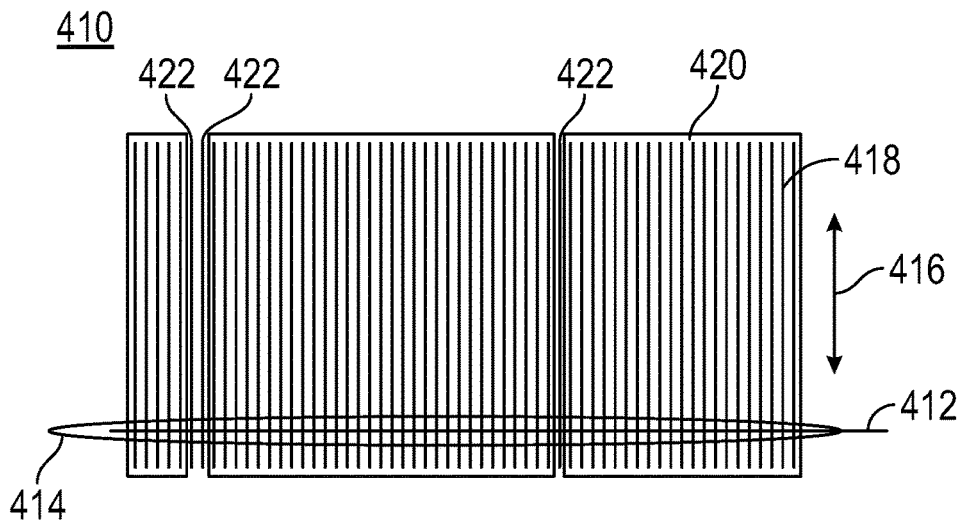
FIG. 4A is a block diagram representing the binary substrate associated with the model of Boolean network development, in accordance with some embodiments.

Referring now to FIG. 4A, a block diagram representing the binary substrate associated with the model of Boolean network development, in accordance with some embodiments is provided. In particular, the binary substrate 410 can be displayed as a matrix with cases in one direction, and the encoding of each case in the perpendicular direction. The matrix can be vectorized into bit-fields in either direction, which is also done, each one of the directions, to achieve an optimal totality. With the featured procedure, every connection will be fixed, except the coupling of substrate to a switch function input. As shown, a feedback bitstring 412 can be retrieved at one last row instance of the bit-field (sub-object). The method of processing described herein may include parsing the feedback bitstring 412 for a good source match along range 418 by searching in the direction perpendicular to the case sequence 416. In some embodiments, only the relevant case-wise bit positions 422 may be considered. Relevant bit positions are positions that are not directed towards other bit-field (sub-objects) during the feedback. In particular, these bit positions are marked as passes 420, where a pass equals "1." A search can be performed by repetition of a logical AND on the perpendicular bit-fields, until as few perpendicular positions as possible are left. Accordingly, input sources can be marked that possess matching the feedback at 414.

More particularly, the filter level development is a computer model that represents $r_{Out}$ cases of outputs and rnIn [r×(inputs per case)] inputs. It is represented by a bitstring with length r at the first row, representing all cases of outputs after binary propagation, and n bitstrings at the last row, each of length r, representing n inputs for all cases. The filter level development has a "cell" representing each NAND gate with related feedback, and also one cell per input at the last row, two per represented NAND above. Thus there is one room per input at the last row. If there is F numbers of rows, there will be $2^{(F-1)}$ cells at the last row.

Figure 4B:
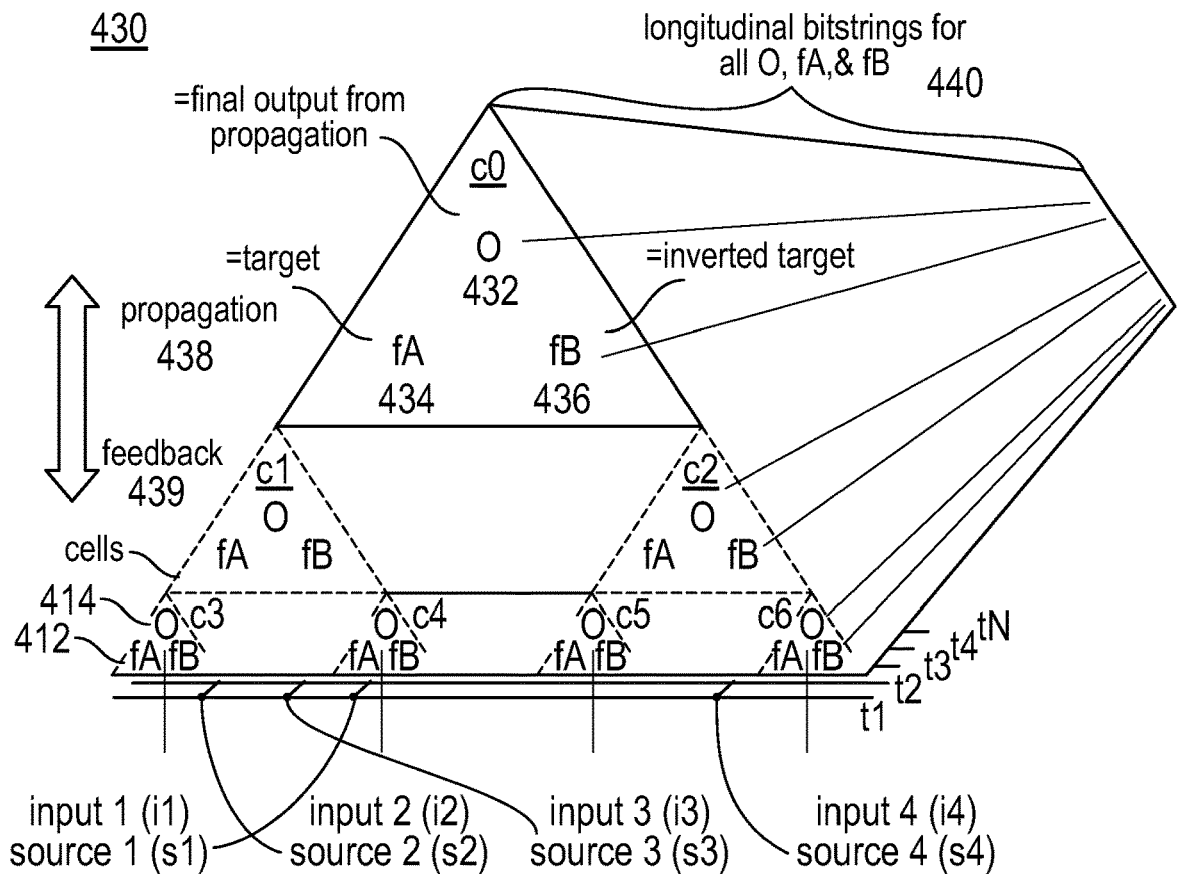
FIG. 4B is a block diagram representing a model of Boolean network development, in accordance with some embodiments.

Referring now to FIG. 4B, a block diagram representing a model of Boolean network development, in accordance with some embodiments is provided. This block diagram 430 represents an overview of the primary building block regarding the computer model for generating the Boolean network development environment. As shown, the Boolean network is comprised of N (3) rows of X cells (c0-c6), wherein longitudinal bitstrings 440 are feed into the model 430 at output (O) and inputs (fA and fB). Each filter level may include a multi-row complex, where each row doubles the number of NAND-gates that represent cells (c0-c6). The programming of the filter level is done exclusively by exchanging sources at the inputs of the last row. Given a single case of inputs from the last row, the output signal from one final filter is either "1" or "0" at the first row.

During development, the inputs and output are all strings, representing all cases, or a chosen batch thereof. In some embodiments, handwritten digits may be processed from a database and converted into "1"s (for any value above "0") and "0"s. The system described herein can run on a strictly binary substrate. Granular values can be converted to binary in different ways. For example, values can be converted in stages using intermediaries. Transversal (perpendicular) bitstrings (t1-tN) are used to supply source bitstrings (s1-s4) for the model 430. After initialization of the Boolean network environment and selection of a target bitstring, this target bitstring can be inserted into fA (434) and the inverted version of the target (NOT fA) can be inserted into fB (436). Each filter includes a predetermined number of rows having a predetermined number of cells. Each cell has a first and second feedback input (fA and fB) and an output (O). Further, this building block for the system of Boolean network development may include the application of sources (s1-s4), wherein each one corresponds to a cell. Further, each source (s1-s4) aligns with the positions of the transversal bitstrings, where the same positions correspond to the each longitudinal string. During the method of generating a Boolean network development environment, a loop of processing through the steps of: updating input; performing binary propagation; performing binary feedback; and updating the source is repeated (also known as a turn). Multiple turns can be performed to get a result ("final output O from propagation") that closely resembles the target bitstring, fA. During the full arrangement having multiple choices of targets, the target bitstring must only represent one of them, or a few categorized together.

In particular, in some embodiments the method corresponding to the generation of the Boolean network development environment includes a repeated process of updating input, binary propagation through the model, binary feedback and source updating. In particular, during the input update, inputs (i1-i4) are updated in a random fashion. During binary propagation 438, the resultant operands of each cell (c0-c5) progress from the last row to the first row, wherein inputs are feed into the last row of the filter. For example, inputs (i1-i4) are feed into the cells (c3-c6). The result is a final output 432 from cell c0. During the binary feedback phase 439, the feedback is sent from the first row to the last row, which result in feedback strings, fA (434), and fB (436) being applied to the last row. During the development stage, the cells represent what will become a net of NAND-gates that make up the Boolean network. In particular, each cell can correspond to a NAND-gate, with the exception of the last row where each cell output (O) is set equal to one source (s1-s4). The sources are tested and updated. For example, in some embodiments, given a case of 28×28 pixels, 784 alternatives can be weighted in as sources. The sources are aligned transversally in bitstrings. When the logical AND function is repeatedly performed with more and more bitstrings added where each represents a case input constellation, (starting from a full seed), the set bit positions (having "1"s) become less and less common, until there are no set positions left on the accumulated bitstring. Accordingly, the method will backtrack one loop in an effort to find a good candidate.

Referring now to FIG. 5, a block diagram of a process user interface representing select bitstrings associated with the Boolean network development environment of FIG. 4B, in accordance with some embodiments is provided. In particular, an example of the resultant bitstring for the process of updating input; performing binary propagation; performing binary feedback; and updating the source during a turn, is illustrated. As shown, a feedback bitstring 412 can be retrieved at each last row of the cells. The matching the feedback 414 is displayed along with the feedback bitstring 412. In this example, only the relevant case-wise bit positions 422 are considered. The training target 434 and training output 432 are also shown side by side. In this example, an instance 500 of the method 300 for Boolean network development environment associated with complex dynamics may include 277 turns (510) that have been completed, each with a relation of correct outputs/outputs (520) as well as hits/possible hits (530) between an output and target, until the closest similarity (540) between the training output and training target is reached (550). In particular, at the turn with the highest similarity (550), an expected optimal hit-rate for any test sample (560) and (570) exists. Although the similarity generally increases turn for turn, fluctuations can occur, which makes it optimal to use the source constellation of the turn of highest similarity up to any point in time.

Figure 6:
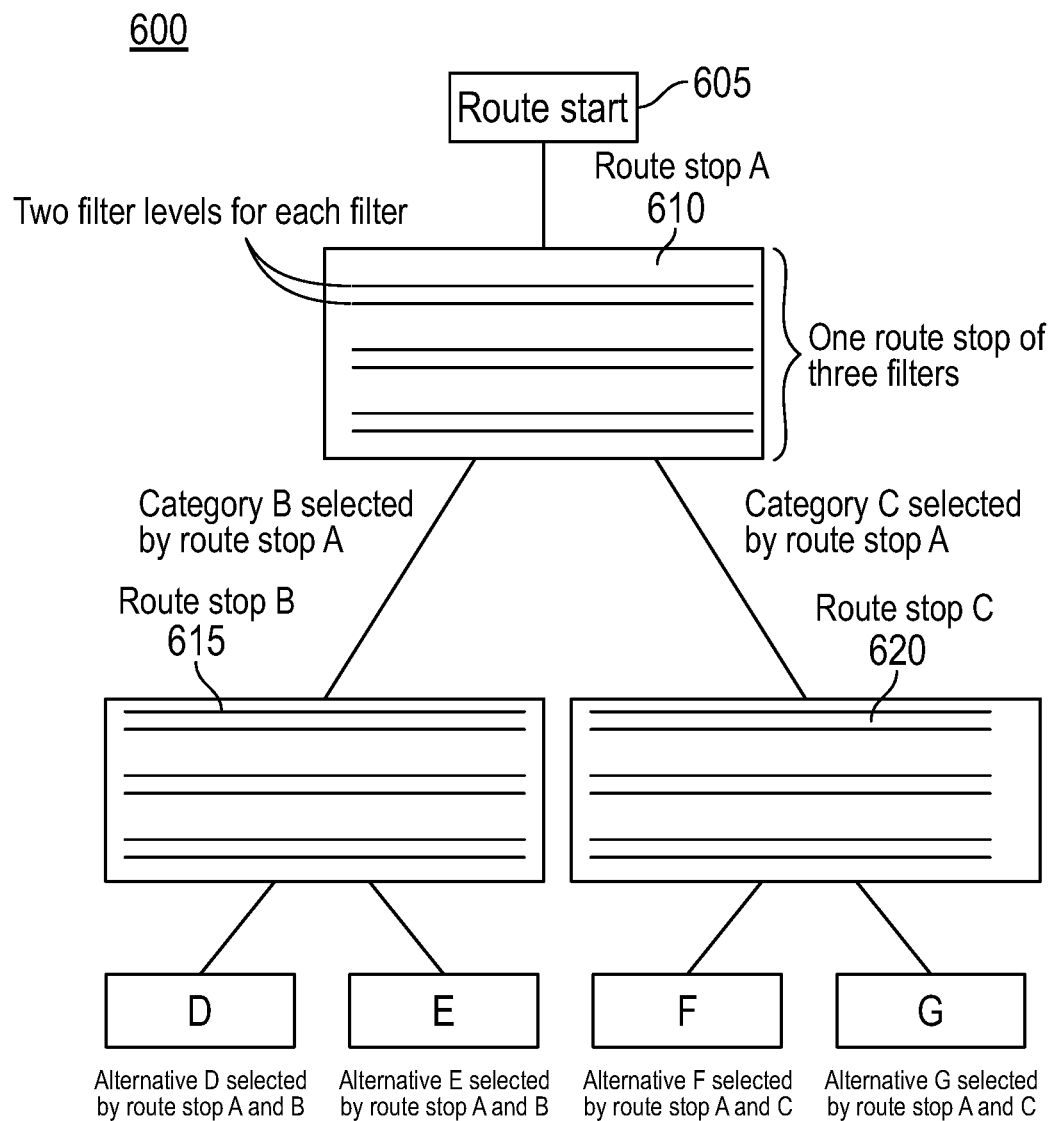
FIG. 6 is a block diagram representing a model of full Boolean network development environment having a multi-choice arrangement, in accordance with some embodiments.

Referring now to FIG. 6, a block diagram representing a model of full Boolean network development environment having a multi-choice arrangement, in accordance with some embodiments is provided. This arrangement provides that multiple filters can be used to accomplish a multiple-choice selection. As shown, a full setup for multi choice evaluation is depicted. In particular, the block diagram model 600 may include a route start 605 and a plurality of route stop modules (Route stop A (610), Route stop B (615), Route stop C (620), Route stop D, Route stop E, Route stop F, and Route stop G). Each route stop module may include a plurality of filters, each having a second plurality of filter rows. As shown, each route stop (A, B, and C) include at least three filters, wherein each filter comprises at least two filter rows. New filter levels are obtained by renewal of the transversal bitstrings within the referral database. In some embodiments, the process for accomplishing new filter levels includes concentrating information in the new referral bitstrings. For example, the method may include running a set of filter level developments against a common average of the outputs, with only a desired frequency as outside target. A bias can be introduced to lead the average toward a certain type of frequency, if the divergence of the spontaneous runs is not satisfactory. As for the realization of the complete setting, these sources are the outputs from Boolean functions. However, since each one of outputs can serve as a source for multiple inputs in any additional row of Boolean functions, the number of gates needed, will not rise exponentially. The development of the system is best done in stages. In some embodiments, the filters may be represented using Boolean NAND-gates. During execution, in some embodiments for example route stop A may select either a category B or C that aligns with Route stop B or C respectively. In some embodiments, Route stop D, for example, may be selected by Route stop A and B. Similarly, Route stop E may be selected by Route stop A and B; while Route stop F and G can be selected by Route stop A and C. The use of multiple filters per route stop will increase accuracy. Further, the use of larger filters, having for example more gates and inputs per filter, can increase accuracy. The flow of information is generally from top to bottom, while the flow of information within a filter is from bottom to top. Suggestions for co-categorization for early route filters can be obtained by listing tendencies of multi-development convergence runs with frequency as only outside target, which can be "blind" or biased. In the latter case, for example, one fixed target can be used among the converged ones. This fixed target can be switched on and off to render an appropriate influence analogous to the principle for multi-level developments.

Referring now to FIG. 7, a schematic representing a NAND gate scheme for an exemplary Boolean network development model relative to the model given in FIG. 4B, in accordance with some embodiments is provided. In some embodiments, the cells may represent two-input NAND gates. As shown, for example, NAND gates 705 and 710 couple to feed NAND gate 715, where NAND gate 715 provides the final output for a single level filter. Inputs to NAND gates 705 and 710 may include inputs (i1-i4), where sources (s1-s4) can be used to feed the outputs of gates 705 and 710 during the development phase. In particular, each cell input of gates 705 and 710 is set equal to one source (s1-s4) as shown; where the sources are already validated during development. This simplified scheme including only 3 NAND-gates shows a hypothetical outcome for development phase. That is, during development, the outputs of the last row cells are used as inputs for the sources. A gate constellation (network) will always have fully filled rows, with a double number of gates per row. The accuracy of the output is obtained only by updating the source selection during development, turn-by-turn. This given arrangement enables a cost-effective design of the Boolean network development model. The arrangement for the Boolean network development model can be varied in size, in that the numbers of rows can differ from one embodiment to another.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 8:
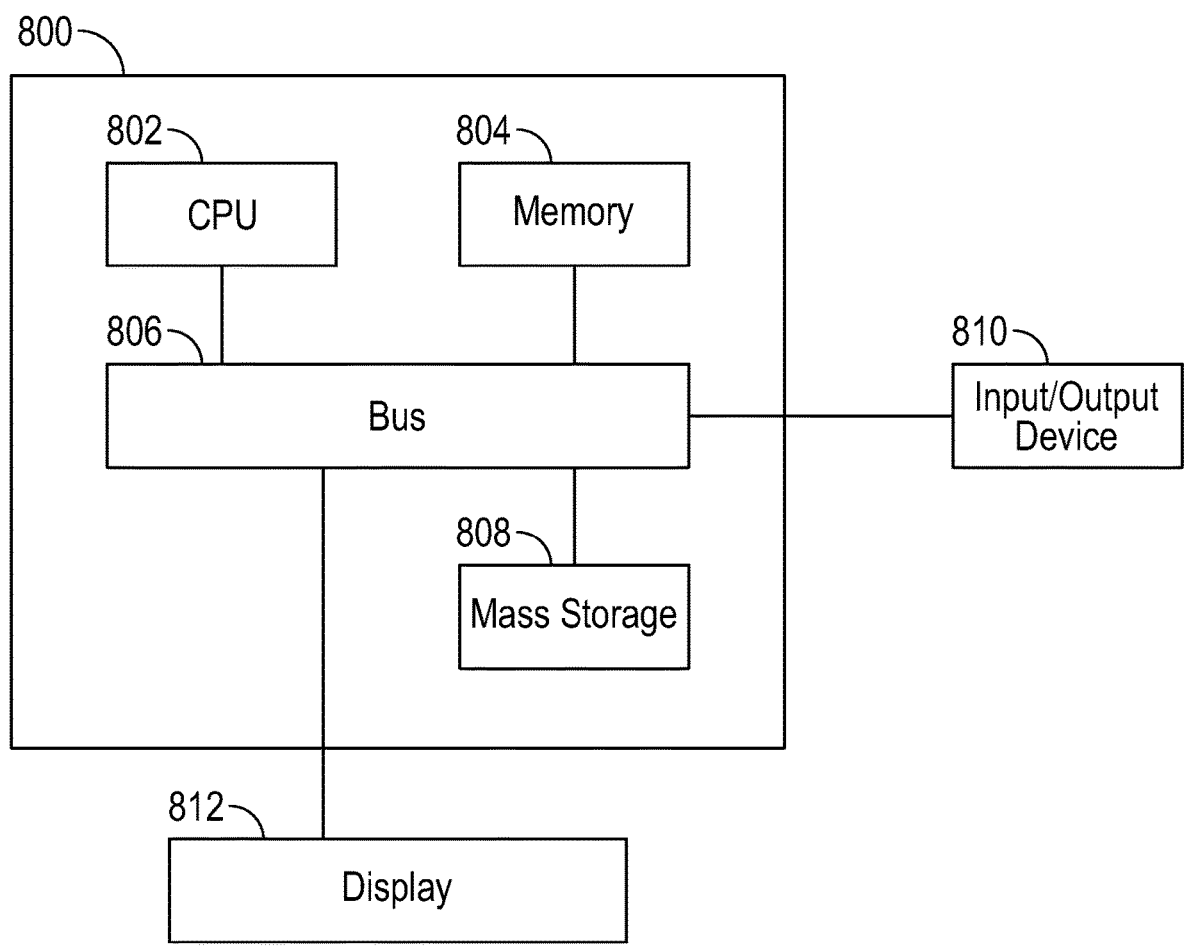
FIG. 8 is a block diagram of an exemplary computing system capable of implementing one or more of the embodiments described and/or illustrated herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device 800, which may implement the embodiments described herein. The computing device of FIG. 8 may be used to perform embodiments of the functionality for performing the cryptography having key agreement in accordance with some embodiments. The computing device includes a central processing unit (CPU) 802, which is coupled through a bus 806 to a memory 804, and mass storage device 808. Mass storage device 808 represents a persistent data storage device such as a floppy disc drive or a fixed disc drive, which may be local or remote in some embodiments. The mass storage device 808 could implement a backup storage, in some embodiments. Memory 804 may include read only memory, random access memory, etc. Applications resident on the computing device may be stored on or accessed through a computer readable medium such as memory 804 or mass storage device 808 in some embodiments. Applications may also be in the form of modulated electronic signals modulated accessed through a network modem or other network interface of the computing device. It should be appreciated that CPU 802 may be embodied in a general-purpose processor, a special purpose processor, or a specially programmed logic device in some embodiments.

Display 812 is in communication with CPU 802, memory 804, and mass storage device 808, through bus 806. Display 812 is configured to display any visualization tools or reports associated with the system described herein. Input/output device 810 is coupled to bus 806 in order to communicate information in command selections to CPU 802. It should be appreciated that data to and from external devices may be communicated through the input/output device 810. CPU 802 can be defined to execute the functionality described herein to enable the functionality described with reference to FIGS. 1-7. The code embodying this functionality may be stored within memory 804 or mass storage device 808 for execution by a processor such as CPU 802 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system as well.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of generating a Boolean network development environment in a Boolean network system performed by a processor-based Boolean network development module, comprising:
    initializing, by the processor-based Boolean network development module, a hierarchy of a Boolean network to define a plurality of cells and a plurality of rows corresponding to the Boolean network, wherein the initializing of the Boolean network comprises:
    identifying, by a target unit within an operations module within the processor-based Boolean network development module, a first cell;
    calculating, by the target unit, the inverse of the target bitstring; and
    inserting, by the target unit, the target bitstring into a first input of the first cell and the inverse of the target bitstring into the second input of the first cell;
    selecting, by the target unit within the operations module, a target bitstring;
    initializing, by the operations module, the Boolean network using the target bitstring;
    assigning, by the operations module, randomly a plurality of source connections to each cell, wherein a plurality of outputs associated with each cell equals the plurality of inputs for each cell;
    actuating, by a binary propagation unit within a filter level development module within the processor based Boolean network development module, binary propagation of a predetermined set of inputs to generate an output bitstring;
    actuating, by a binary feedback unit within the filter level development module, binary feedback using the output bitstring;
    updating, by a source update unit within the filter level development module, the plurality of source connections;
    detecting, by a convergence run unit within the operation module, convergence completion, wherein, in response to no completion detected, repeating the actuating of binary propagation, the actuating of binary feedback, the updating of the plurality of source connections, until convergence completion;
    detecting, by the convergence run unit within the operation module, similarity to the target; and
    generating, by a multiple filter unit within the operation module, multiple filters for each route stop.

2. The method of claim 1, wherein the actuating binary propagation comprises:
    applying the predetermined set of inputs to a last row of the Boolean network, wherein the last row includes a first set of cells, each cell representing a two-input NAND gate;
    feeding outputs of each set of cells on each row of the hierarchy into the inputs of subsequent row, until one output remains; and
    setting the output bitstring to equal the output.

3. The method of claim 1, wherein the actuating binary feedback comprises:
    inserting the output bitstring back into the first cell;
    calculating a set of feedback inputs for each cell of the first row, including a first and a second feedback input (feedbA and feedbB) associated with each cell (c=0, 1, 2, 3, . . . x):
    c.feedbA=p.feedbB OR (NOT n.output),
    c.feedbB=p.feedbA
    where, p is the parent of the cell c and n is the neighbor of the cell c;
    propagating the feedback from the first cell downwards row-by-row; and
    exporting non-pass bit positions to establish a last row feedback, wherein a non-pass bit position equals "0".

4. The method of claim 1, wherein updating the plurality of source connections comprises:
    selecting a predetermined share of cells in a last row;
    updating a portion of the predetermined share of cells in the last row;
    detecting whether a cell remains;
    selecting, in response to one or more cells detected, one cell;
    eliminating, in response to one cell selected, positions of a plurality of transversal bitstrings associated with the plurality of source connections;
    updating, in response to eliminated transversal bitstrings, the source connections of cells in the last row;
    decrementing, in response to updating of the source connections, the predetermined share;
    performing, in response to the decrementing of the predetermined share, the detecting, the selecting, the eliminating, the updating, and the decrementing steps until no cell remains; and
    actuating propagation.

5. The method of claim 1, wherein detecting the similarity to the target comprises:
    calculating similarity (S) using the following:

$$S = \frac{N}{D}$$

$$N = \frac{\sum (AB)_b}{\sum (A)_b \times \sum (B)_b} + \frac{\sum (A'B')_b}{\sum (A')_b \times \sum (B')_b}$$

$$D = N + \frac{\sum (A'B)_b}{\sum (A')_b \times \sum (B)_b} + \frac{\sum (AB')_b}{\sum (A)_b \times \sum (B')_b}$$

where $\Sigma(A)_b, \Sigma(B)_b, \Sigma(A')_b, \Sigma(B')_b$ all are greater than 0, b denotes respective parenthesis as a Boolean expression, and each sum denotes a count of "1"s within each.

6. The method of claim 4, wherein the eliminating transversal bitstrings comprises:
    setting a transversal size bitstring seed (s);
    selecting in a random sequence the non-pass bit positions;
    detecting whether the longitude case position within feedbA equals one;
    setting, in response to the longitude case position equals one, a temporary bitstring (tb) equal to (s AND ci), where ci is the non-negated bit;
    setting, in response to the longitude case position not equal to one, the tb equal to (s AND NOT ci);
    accepting tb as input;
    detecting whether tb equals a bitstring of only "0"s;
    performing, in response to no detection of bitstring of only "0"s, the selecting the non-pass bit positions, the detecting longitude case position equals one, the setting tb, the accepting tb as input and detecting whether tb possesses a bitstring of only "0"s steps, until bitstring of only "0"s is detected;

referencing, in response to detecting bitstring of only "0"s, a previous loop tb;

selecting one transversal bit of a portion of the least transversal bit positions using a random sequence; and setting the source to the selected transversal bit.

7. A Boolean network development environment system performed by a processor-based Boolean network development module, comprising:

a memory; and a processor operable to:
  initialize, by the processor-based Boolean network development module, a hierarchy of a Boolean network to define a plurality of cells and a plurality of rows corresponding to the Boolean network, wherein the processor is operable to:
    identify, by a target unit within an operations module within the processor-based Boolean network development module, a first cell;
    calculate, by the target unit, the inverse of the target bitstring; and
    insert, by the target unit, the target bitstring into a first input of the first cell and the inverse of the target bitstring into the second input of the first cell;
  select, by the target unit within the operations module, a target bitstring;
  initialize, by the operations module, the Boolean network using the target bitstring;
  assign, by the operations module, randomly a plurality of source connections to each cell, wherein a plurality of outputs associated with each cell equals the plurality of inputs for each cell;
  actuate, by a binary propagation unit within a filter level development module within the processor-based Boolean network development module, binary propagation of a predetermined set of inputs to generate an output bitstring;
  actuate, by a binary feedback unit within the filter level development module, binary feedback using the output bitstring;
update, by a source update unit within the filter level development module, the plurality of source connections;
  detect, by a convergence run unit within the operation module, convergence completion, wherein, in response to no completion detected, repeating the actuating of binary propagation, the actuating of binary feedback, the updating of the plurality of source connections, until convergence completion;
  detect, by the convergence run unit within the operation module, similarity to the target; and
  generate, by a multiple filter unit within the operation module, multiple filters for each route stop.

8. The Boolean network development environment system of claim 7, wherein the processor, for actuating binary propagation, operable to:

apply the predetermined set of inputs to a last row of the Boolean network, wherein the last row includes a first set of cells, each cell representing a two-input NAND gate;

feed outputs of each set of cells on each row of the hierarchy into the inputs of subsequent row, until one output remains; and set the output bitstring to equal the output.

9. The Boolean network development environment system of claim 7, wherein the processor, for actuating binary feedback, operable to:

insert output bitstring back into the first cell;

propagate the feedback from the first cell downwards row-by-row;

calculate a set of feedback inputs for each cell, including a first and a second feedback input (feedbA and feedbB) associated with each cell (c=0, 1, 2, 3, ... x):

c.feedbA=p.feedbB OR (NOT n.output), c.feedbB=p.feedbA where, p is the parent of the cell c and n is the neighbor of the cell c;

propagate the feedback from the first cell downwards row-by-row; and export non-pass bit positions to establish a last row feedback, wherein a non-pass bit position equals "0".

10. The Boolean network development environment system of claim 7, wherein the processor, for updating the plurality of source connections, operable to:

select a predetermined share of cells in a last row;

update a portion of the predetermined share of cells in the last row;

detect whether a cell remains;

select, in response to one or more cells detected, one cell;

eliminate, in response to one cell selected, positions of a plurality of transversal bitstrings associated with the plurality of source connections;

update, in response to eliminated transversal bitstrings, the source connections of cells in the last row;

decrement, in response to updating of the source connections, the predetermined share;

perform, in response to the decrementing of the predetermined share, the detecting, the selecting, the eliminating, the updating, and the decrementing steps until no cell remains; and actuate propagation.

11. The Boolean network development environment system of claim 7, wherein the processor, for detecting the similarity to the target, operable to:

calculate similarity (S) using the following:

$$S = \frac{N}{D}$$

$$N = \frac{\sum (AB)_b}{\sum (A)_b \times \sum (B)_b} + \frac{\sum (A'B')_b}{\sum (A')_b \times \sum (B')_b}$$

$$D = N + \frac{\sum (A'B)_b}{\sum (A')_b \times \sum (B)_b} + \frac{\sum (AB')_b}{\sum (A)_b \times \sum (B')_b}$$

where $\Sigma(A)_b, \Sigma(B)_b, \Sigma(A')_b, \Sigma(B')_b$ all are greater than 0, b denotes respective parenthesis as a Boolean expression, and each sum denotes a count of "1"s within each.

12. The Boolean network development environment system of claim 10, wherein the processor, for eliminating transversal bitstrings, operable to:

set a transversal size bitstring seed (s);

select in a random sequence the non-pass bit positions;

detect whether the longitude case position within feedbA equals one;

set, in response to the longitude case position equals one, a temporary bitstring (tb) equal to (s AND ci), where ci is the non-negated bit;

set, in response to the longitude case position not equal to one, the tb equal to (s AND NOT ci);

accept tb as input;

detect whether tb possesses a bitstring of only "0"s;

perform, in response to no detection of bitstring of only "0"s, the selecting the non-pass bit positions, the detecting longitude case position equals one, the setting tb, the accepting to as input and detecting whether tb possesses a bitstring of only "0"s steps, until bitstring of only "0"s is detected;

reference, in response to detecting bitstring of only "0"s, a previous loop tb;

select one transversal bit of a portion of the least transversal bit positions using a random sequence; and set the source to the selected transversal bit.

13. A non-transitory computer-readable medium including code for performing a method of generating a Boolean network development environment in a Boolean network system performed by a processor-based Boolean network development module, the method comprising:

initializing, by the processor-based Boolean network development module, a network hierarchy to define a number of cells and rows corresponding to a network, wherein the initializing of the network hierarchy comprises:

identifying, by a target unit within an operations module within the processor-based Boolean network development module, a first cell;

calculating, by the target unit, the inverse of the target bitstring; and inserting, by the target unit, the target bitstring into a first input of the first cell and the inverse of the target bitstring into the second input of the first cell;

selecting, by the target unit within the operations module, a target bitstring;

initializing, by the operations module, the network using the target bitstring;

assigning, by the operations module, randomly a plurality of source connections to each cell, wherein a plurality of outputs associated with each cell equals the plurality of inputs for each cell;

actuating, by a binary propagation unit within a filter level development module within the processor based Boolean network development module, binary propagation of a predetermined set of inputs to generate an output bitstring;

actuating, by a binary feedback unit within the filter level development module, binary feedback using the output bitstring;

updating, by a source update unit within the filter level development module, the plurality of source connections;

detecting, by a convergence run unit within the operation module, convergence completion, wherein, in response to no completion detected, repeating the actuating of binary propagation, the actuating of binary feedback, the updating of the plurality of source connections, until convergence completion;

detecting, by the convergence run unit within the operation module, similarity to the target; and generating, by a multiple filter unit within the operation module, multiple filters for each route stop.

14. The computer-readable medium of claim 13, wherein the actuating binary propagation comprises:

applying the predetermined set of inputs to a last row of the Boolean network, wherein the last row includes a first set of cells, each cell representing a two-input NAND gate;

feeding outputs of each set of cells on each row of the network hierarchy into the inputs of subsequent row, until one output remains; and setting the output bitstring to equal the output.

15. The computer-readable medium of claim 13, wherein the actuating binary feedback comprises:

inserting output bitstring back into the first cell;

propagating the feedback from the first cell downwards row-by-row;

calculating a set of feedback inputs for each cell of the first row, including a first and a second feedback input (feedbA and feedbB) associated with each cell (c=0, 1, 2, 3, . . . x):

c.feedbA=p.feedbB OR (NOT n.output), c.feedbB=p.feedbA where, p is the parent of the cell c and n is the neighbor of the cell c;

propagating the feedback from the first cell downwards row-by-row; and exporting non-pass bit positions to establish a last row feedback, wherein a non-pass bit position equals "0".

16. The computer-readable medium of claim 15, wherein updating the plurality of source connections comprises:

selecting a predetermined share of cells in a last row;

updating a portion of the predetermined share of cells in the last row;

detecting whether a cell remains;

selecting, in response to one or more cells detected, one cell;

eliminating, in response to one cell selected, positions of a plurality of transversal bitstrings associated with the plurality of source connections;

updating, in response to eliminated transversal bitstrings, the source connections of cells in the last row;

decrementing, in response to updating of the source connections, the predetermined share;

performing, in response to the decrementing of the predetermined share, the detecting, the selecting, the eliminating, the updating, and the decrementing steps until no cell remains; and actuating propagation.

17. The computer-readable medium of claim 16, wherein the selecting of a predetermined share of cells of the last row comprises:

generating a random number; and identifying the cells associated with the random number.

* * * * *